United States Patent [19]

Burlingame et al.

[11] 4,075,370
[45] Feb. 21, 1978

[54] PASSIVATING METALLIC CUTTINGS AND TURNINGS

[75] Inventors: Richard D. Burlingame, Cleveland Heights, Ohio; Michael Markels, Jr., Springfield, Va.

[73] Assignees: Ogden Metals, Inc., Cleveland, Ohio; Versar, Inc., Springfield, Va.

[21] Appl. No.: 680,830

[22] Filed: Apr. 28, 1976

[51] Int. Cl.² ............................................. C23F 9/02
[52] U.S. Cl. .................................. 427/216; 427/242; 428/403; 428/921; 148/6
[58] Field of Search ................. 427/216, 242; 428/403, 428/404; 29/192 CP; 75/.5 BA, .5 AA; 148/6

[56] References Cited

U.S. PATENT DOCUMENTS

| | | | |
|---|---|---|---|
| 2,639,269 | 5/1953 | Dube | 427/242 X |
| 2,758,039 | 8/1956 | Barbour | 427/242 X |
| 3,317,307 | 5/1967 | Wise et al. | 427/242 X |
| 3,690,930 | 9/1972 | Mueller et al. | 427/216 |
| 3,869,894 | 3/1975 | Meyer et al. | 427/242 X |

*Primary Examiner*—Ralph S. Kendall
*Attorney, Agent, or Firm*—Dowell & Dowell

[57] ABSTRACT

A method of passivating iron-containing cuttings and turnings to prevent overheating thereof during storage and transportation, wherein the cuttings and turnings are fed through a rotating tumbler drum while being mixed with an aqueous slurry of calcium oxide or hydroxide, the tumbling being continued until the cuttings or turnings are thoroughly coated with the slurry. In a preferred embodiment, the cuttings and turnings are passed through a tumbling drum continuously, with the slurry being sprayed onto them as they enter the drum.

5 Claims, 3 Drawing Figures

PASSIVATING METALLIC CUTTINGS AND TURNINGS

FIELD OF INVENTION

This invention relates to an improved method for passivating metallic cuttings or turnings which are stored or transported in bulk by coating them with calcium compounds to prevent over-heating of the cuttings and turnings due to oxidation or other corrosion of the metal in the presence of an oxygen containing atmosphere, particularly where ferrous materials are included.

BACKGROUND AND PRIOR ART

The storage of shipment in bulk or scrap materials such as cuttings or turnings containing iron has always been subject to the problem of severe overheating with the threat of spontaneous combustion, and this problem has remained without a practical solution, partly because the relatively low monetary value of such scrap material tends to make treatment uneconomic unless it can be done very inexpensively. The severity of the problem is indicated by a regulation of the U.S. Coast Guard that no ship can sail with a cargo of this type until, after loading, the temperature of the bulk cargo either falls below 150° F, or where the temperature exceeds 150° F, it must show a continuous downward trend for at least 8 hours. Disturbing of the bulk material due to the loading thereof into a hold aggravates the tendency to overheat, and it is a frequent occurrence for a fully loaded vessel to be in port for many days waiting for cargo heating to subside, resulting in heavy financial loss to the operators and high insurance rates.

Several different approaches have been tried to solve the problem. One approach is to deny the cargo air, for instance by introducing a passivating gas such as nitrogen or ammonia or carbon dioxide into the hold, or by conditioning the air in the hold to reduce its moisture content. U.S. Pat. No. 3,704,088 to Nagel et al and U.S. Pat. No. 3,723,059 to Thum et al are of this type.

In U.S. Pat. No. 3,551,215 to Claiborne et al the temperature of the metal particles is raised to a high level and then the particles are treated either with oxygen or steam before cooling them, but this would be uneconomical because of the high energy input required to reach the elevated temperatures involved.

Another approach is to treat the turnings or cuttings with chemicals which inhibit corrosion. In U.S. Pat. No. 2,913,305 to Andersen the turnings or cuttings are corrosion inhibited by treating their surface with organic acid salts which tend to coat them. In U.S. Pat. No. 2,156,357 to Simpson the treatment of sheet metal surfaces is done with calcium oxide or calcium hydroxide which prevents the iron sheets from rusting during shipment, it being well known that these calcium compounds have an anti-corrosive effect on iron.

During a series of early experiments run by the applicant while seeking a solution to the problem, various approaches were tried which were not successful. In one experiment, blocks of dry ice were packed in a hold interspersed with a cargo of iron turnings on the theory that the carbon dioxide from the dry ice would displace the air between the turnings and leave the cargo in an inert atmosphere. However, the approach failed partly because convection due to the overheating brought in enough new air to sustain the corrosion, and partly because the carbon dioxide failed to disperse adequately throughout the cargo leaving hot pockets. Next, the applicant tried treatment with calcium oxide or hydroxide by spraying it into the cargo, or by dry mixing powder with the turnings, but this approach yielded no cure apparently because there were enough surface areas of the turnings which remained uncoated that the overheating of the bulk proceeded with little abatement.

Basically, the problem of overheating is attributable to corrosion of an exothermic nature, the heat generated thereby being spread in the cargo by convection so that the heating effect tends to become a chain reaction. Industrial turnings contain several percent by weight of machining oil as well as combustible debris and substantial amounts of water.

Two degrees of overheating are common when turnings are confined in a ship's hold. In the case of relatively new uncontaminated good quality turnings, the temperature tends to rise to temperatures in the vicinity of 200° F, so that the water vaporizes and is given off as steam. Such turnings tend eventually to cool down again, resulting in no damage to the cargo or the ship. However, where the turnings are old, are of poor quality and/or contaminated with flammable debris, the overheating proceeds beyond the 200° level and tends to reach the vicinity of 340° F whereat the oil is burned off with a heavy white smoke, and if the cargo continues heating toward 500° F it may be engulfed and the ship endangered. Once such elevated temperatures are approached there is little chance of reversing the process. It can not be extinguished using sea water (short of flooding) or using extinguisher chemicals, because these are themselves corrosive and only aggravate the overheating. The chain reaction which depends on oxygen could be stopped if it were possible to cut off the oxygen supply, but this cannot be done in the ordinary case since convection prevents effective dispersion of passivating gases such as nitrogen or carbon dioxide through the cargo. For instance, spraying the top of the cargo with liquid nitrogen produced no noticeable improvement in an overheating situation where it was tried. It is expected that it would be possible to re-design a hold in a ship to permit effective displacement of the oxygen from the cargo by some other gas, but this is not a practical solution in the case of presently existing ships.

THE INVENTION

The present invention effectively coats the turnings prior to loading them into the hold of a ship, or other storage area, by tumbling the turnings with a wet paste or slurry of calcium oxide or calcium hydroxide. It is of course well known that a slightly alkaline coating tends to slow down corrosion reactions on iron containing surfaces, whereas, acids tend to increase the rate of corrosion. Basically, the problem involved in the present disclosure is how to produce adequate coating of the turnings in an economical manner. It has been found that tumbling of the turnings with the slurry added to them as the turnings are introduced into one end of a tumbling drum provides turnings emerging from the other end of the drum which are coated by the slurry, a typical residence time being between 1 and 5 minutes in the tumbling drum. This tumbling is carried out prior to loading of the turnings into the hold or other confined area and before the turnings have been compressed to their ultimate storage density. Such tumbling can be accomplished as a part of the process of handling the turnings during transfer thereof from the dock to the hold of the ship. Before loading into the hold, the turnings tend to lie on the dock and become relatively passive, but when they are disturbed by moving them, such disturbance seems to expose new areas of activity to the air and start the corrosive process again, leading to overheating in the hold of the ship. It is found that only a small percentage by weight of the slurry is adequate, providing the tumbling thoroughly disperses the slurry through the turnings.

It is a principal object of this invention to provide an improved process for passivating iron-containing turnings, chips, and other scrap metals to prevent overheating thereof during transportation and storage.

It is another major object of the invention to provide a cost-effective method of passivating such a cargo, bearing in mind the monetary value of the cargo which is low enough so that it severely limits the amount of money which can be spent in passivating it. In order to be a useful process, the cost of treating the cargo must be less than the cost of allowing the ship, once loaded, to lie in port until the temperature of the cargo stabilizes and has fallen for a period of at least 8 hours.

Another object of the invention is to provide a passivating method which is relatively simple and can be accomplished during a brief interval of time, in particular, during actual loading of the ship in many cases.

Another important object of the invention is to use chemical treatment which is relatively cheap and widely available, and to use chemicals which do not generate hazardous or noxious gases.

One of the principal objects of this invention is to provide a chemical treatment in which the chemicals used do not constitute a contaminant in steel making processes. It should be pointed out that the ultimate destination of the cargo is generally a steel making plant, and that anything which is added to the cargo may be subject to subsequent removal before the cargo can be used. It is therefore a most important feature of the invention that the use of calcium oxide or calcium hydroxide is not viewed by the industry as a contaminant because lime is used in the steel making process so that its presence will aid, not hurt, the subsequent use of the steel cuttings. This represents a substantial advantage, and points up the undesirability of using other alkaline chemicals such as sodium compounds which would have to be removed at the plant before the cuttings could be used. Moreover, the sodium ion is quite corrosive and might therefore produce a considerable hazard of overheating when introduced into the cargo, it having been pointed out above, that the salt in sea water increases the rate of corrosion of the cargo.

It is another object of this invention to provide a process which is also highly effective when used with other ferrous-alloys, such as ferrous-manganese and ferrous-zirconium, these materials comprising a porous mass which has a very high tendency to burst into combustion, partly because its surface area is so great. Another iron product which is dangerous to transport is cast-iron cuttings because the carbon modules form galvanic couples with the iron which tend to produce heating.

Another object of the invention is to provide a coating which is quite insoluble in water and will not tend to be washed away, if, after tumbling, the turnings are stored out of doors where they may be wetted by rain. In general, the present process including the tumbling step should be carried out in such a way as to cooperate with prevailing loading and shipping conditions so as to require a minimum change in procedure.

Other objects and advantages of the invention will become apparent during the following discussion of the drawing, wherein:

THE DRAWING

Figure 1:
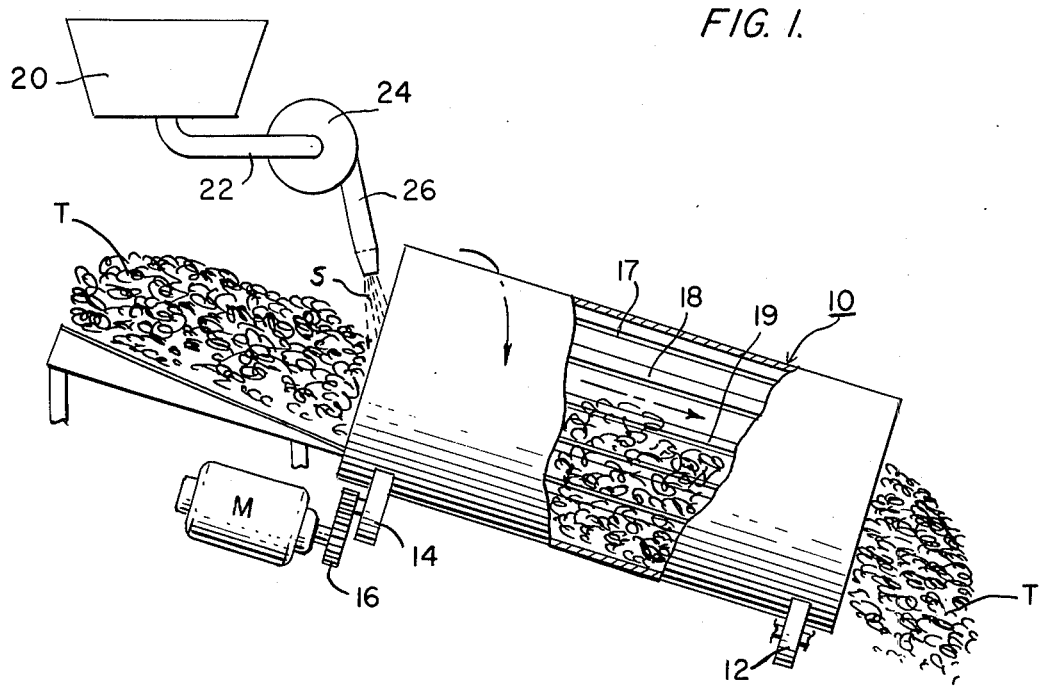
FIG. 1 is a view showing a tumbling drum having turnings fed therethrough while being sprayed at the input end with a passivating slurry.

Referring now to the drawing, FIG. 1 shows a tumbling drum 10 supported on rollers 12 and 14 at least some of the rollers 14 being driven by a motor M so that the drum continously rotates. The drum has a series of longitudinal flites 17, 18, and 19, etc., preferably in the form of angle irons welded to the inner surface of the drum so as to impart a lifting motion to the turnings T which are being fed into the drum from the left and exit from the drum to the right thereof after a residence time within the drum during which the turnings are tumbled. Above the drum is located a tank 20 containing a paste-like slurry of calcium oxide or hydroxide suspended in water. The slurry leaves the tank through a pipe 22 and enters a pump 24 which pumps the slurry into a spray pipe 26 discharging the slurry S onto and among the turnings as they enter the left end of the tumbling drum 10. The drum is preferably inclined at an angle of 10° to 15° or so, so as to aid the turnings in passing through the drum and falling out the right-hand side thereof as illustrated in the drawing. The angle of drum inclination also tends to affect the residence time of the turnings within the drum which according to experiments is in the range of 1 to 5 minutes. By the time the turnings exit from the drum, all of the slurry is coated onto the turnings so that there is virtually no drippage of slurry from the other end of the drum.

Figure 2:
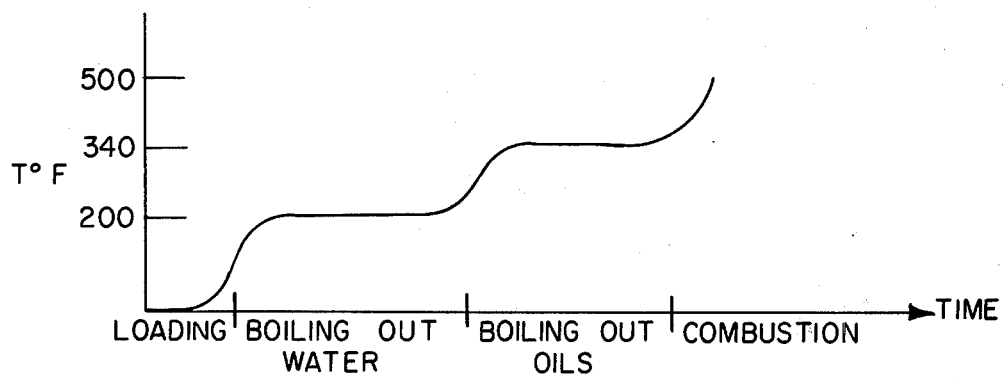
FIG. 2 is a graphical illustration showing the rise in temperature versus time of an overheating cargo in a confined space.

FIG. 2 is a graphical illustration of typical overheating which can occur in an untreated iron-containing cargo which is provided with adequate oxygen. This curve begins at the left end at time zero and shows the beginning of the rise in temperature of the cargo during and after loading thereof into the hold. The temperature rises fairly rapidly after loading and reaches 200° or higher in the areas where the overheating is worst, thereby causing water contained on the surfaces of the turnings to begin boiling off. It is common to see water vapor in the form of steam emerging as a cloud from the hold of a ship while the vessel is waiting stabilization of the cargo temperature. If the cargo is composed of relatively uncontaminated turnings, the probability is that the curve will not rise to the 200° level, but may branch off and begin a slow fall in temperature thereafter. However, if the turnings are not of high quality and are substantially contaminated, the main curve will then continue at around the 200° level, or above, until all of the steam has left the cargo, and if the overheating is severe, the temperature will then rise in rather a short period of time to a much higher temperature, for instance, around 340° at which point the oil begins burning off. At the end of this interval, the cargo may again stabilize and start losing temperature, or it can follow an abrupt rise in temperature as shown near the right end of the curve and go into actual combustion. The temperature of the combustion of course greatly exceeds the 500° mark shown on this graphical representation.

Figure 3:
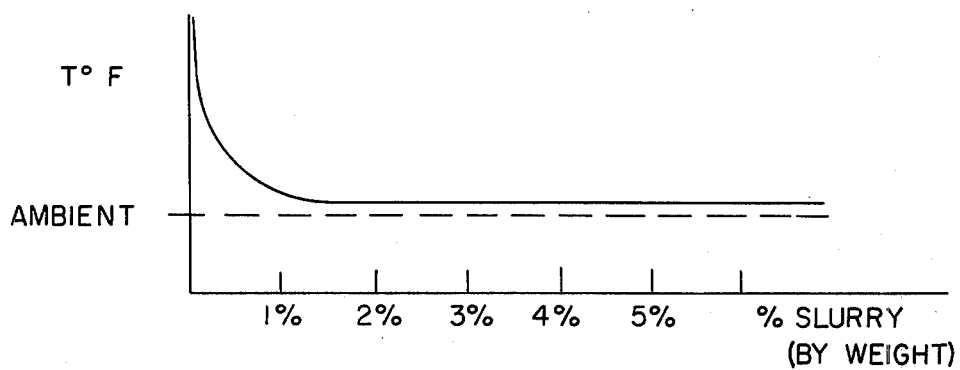
FIG. 3 is a graphical illustration showing the effect of the percent by weight of the slurry added to the turnings, versus temperature of the stored mass as compared with the ambient temperature.

FIG. 3 is a graphical representation showing the effect of the percent of lime slurry by weight added to the turnings by thorough tumbling thereof together in the drum 10. This curve shows that without any treatment the temperature of the cargo can rise abruptly. The tumbling of about 1% by weight of slurry into the turnings has a very large effect upon the temperature, reducing it down to a much safer level, but perhaps allowing it to rise sufficiently so that the ship according to Coast Guard Regulations would have to delay its sailing. The curve of FIG. 3 shows that by the time 2% by weight of the slurry has been tumbled into the turnings, the turnings are sufficiently passivated that they show only a small temperature rise above ambient level. The curve further shows that the addition of more slurry provides very little improvement since effective passivation has already been accomplished, and therefore, it is unnecessary to further increase the percentage of slurry used. This curve represents the treatment of ordinary iron cuttings or turnings. Where a more active cargo is being treated, it may be desirable to raise somewhat the percent slurry used.

EXAMPLES

In order to demonstrate the effects of various factors, a series of experiments is set forth below which were run in a controlled temperature laboratory oven in which various turnings and cuttings of different quality and contamination were subjected to a higher than usual ambient temperature in order to accelerate the process of overheating, and also to demonstrate passivation under even very adverse circumstances of ambient temperature. In general, the experiments showed that in the cases where turnings were placed in the oven under circumstances fostering overheating, the overheating effect became very apparent, but where similar materials were treated so as to discourage overheating, the turnings which were placed in the hot oven tended to rise in temperature only to a point just below or at the oven temperature. The following examples illustrate the above mentioned tendencies.

EXAMPLE NO. 1

Initial runs were carried out in an effort to determine what would happen with untreated turnings in a cargo. In one run, a batch of iron turnings of contaminated nature was placed in the oven whose temperature was set at 325° F. The particular turnings used were old and rusty, relatively fine turnings broken into small pieces, and had an approximate moisture content of 0.1% and an oil content of 6.2% by weight. The oven was continuously supplied with an adequate supply of air to support any corrosion which was likely to take place. At the end of 10 hours, the temperature of the turnings had risen from room temperature to the 325° F oven temperature. By 20 hours, the temperature of the turnings had risen to about 440° F, and by 30 hours the temperature of the turnings had reached about 520° F and remained at that temperature for about 10 hours, subsequently dropping back again to approximately 350° F at the time the experiment was concluded. The air temperature in the oven during this time was maintained at about 325° F, or as closely as it could be maintained. During some other similar experiments, temperatures as high as 550° F were experienced in the turnings.

EXAMPLE NO. 2

This example was carried out under similar circumstances with the sole exception that the oven was flushed with carbon dioxide gas instead of air for the first 50 hours. During that time, the temperature of the turnings rose from room temperature to the approximate temperature of the oven, 325° F, and then increased slightly beyond that temperature by about 5° or so from 30 hours to 50 hours. At 50 hours, in order to demonstrate what would happen if air was returned to the oven, the carbon dioxide gas was displaced from the oven by the introduction of air, and the experiment was allowed to proceed. This change-over occurred at about 50 hours with the temperature of the turnings being about 330° F, and by 60 hours the temperature had risen to about 400° F. By 70 hours, the temperature had risen to 500° F, and by 75 hours the temperature had risen to about 550°F. The temperature was still rising slightly at the end of 80 hours, at which time the experiment was terminated.

EXAMPLE NO. 3

This example was similar to Examiner #1, except that the turnings were initially washed with an organic solvent which removed oil, moisture, and other contaminants from the turnings. After the solvent had evaporated from the turnings, they were placed in the oven and flushed with air, and the oven temperature being maintained at 325° F. For about the first 14 hours, the temperature of the clean dry turnings approached the oven temperature of 325° F. The temperature of the turnings increased beyond oven temperature to a point just below 350° F, and remain there only briefly, the peak having been reached at about 18 hours. By the end of 20 hours, the temperature was falling, and by about 27 hours, the temperature had returned approximately to the temperature of the oven 325° F. Thus, it was demonstrated that clean turnings had little tendency to overheat, showing that the contaminants tend to catalyze the reaction.

EXAMPLE NO. 4

Since the turnings themselves contain moisture, an experiment was run with turnings containing about 5% moisture to determine the possibility of adding the calcium oxide as a dry powder to passivate the turnings. These turnings were mixed with 1% by weight of calcium oxide powder and inserted into the oven whose temperature was 325° F. It appeared from this experiment there had been no benefit achieved by using the dry powder. The temperature rise was comparable with that in Example #1. By the end of 10 hours, the temperature of the turnings was just crossing the oven temperature of 325° F and was rising rapidly. By 20 hours, the temperature had risen to 450° F and showed only slight evidence of slowing its rate of increase. The experiment was therefore terminated, and it was assumed that the dry powder was ineffective. As a matter of fact, the use of dry powder accelerates the overheating effect, primarily because of the strongly exothermic reaction of calcium oxide with water. In order to avoid this exothermic effect accompanying the use of dry calcium oxide powder, a similar run was made using dry calcium hydroxide powder mixed with the turnings. The overheating reaction proceeded as if no calcium hydroxide powder were present at all. It appears that this approach produced insufficient OH ions to passivate the turnings. The dry calcium hydroxide merely behaved like an inert material and proved to be of no value whatever.

EXAMPLE NO. 5

In this example, the turnings were mixed with calcium hydroxide in an aqueous slurry. The oven temperature was reset to 150° F so as to simulate the upper limit of the Coast Guard's Specification and demonstrate what would happen at this limit. With an oven temperature of 150° F different quantities of the calcium hydroxide slurry were mixed in successive batches. Where the amount of slurry mixed with the turnings was only 0.833% by weight of the turnings, the temperature of the turnings rose within 5 hours from room temperature to 150° F, passed the 150° level, and reached 170° by 10 hours. By 15 hours, the temperature of the turnings had reached about 185° F. The temperature then increased slightly beyond that level to about 20 hours, and then fell slowly back toward the ambient temperature of 150° F.

In the next test batch, the turnings were mixed with 1.66% slurry of calcium hydroxide by weight, and this slurry had a considerably greater passivating effect, requiring about 9 hours for the turnings to reach 150° F, and then rising slowly only to about 160° F over the next 10 hours. After 20 hours, the temperature of the turnings fell slowly back toward the 150° level.

When the percent by weight of slurry was increased to 2%, the temperature of the turnings beginning at room temperature rose over a period of about 15 hours to a level just below the temperature of the oven, and then slowly approached that temperature, but at no time exceeded it. When the percent by weight of slurry was increased to 2.50% the temperature of the turnings increased from room temperature to about 130° by 20 hours, but at the end of 50 hours was still only approaching the ambient oven temperature of 150° F. From this, it is concluded that a percentage by weight of between 1.66 and 2% adequately passivates the turnings for all intents and purposes.

EXAMPLE NO. 6

In a subsequent series of tests, the oven temperature was increased from 150° F to 200° F. The use of about 3% by wieght of calcium hydroxide in the slurry form passivated the turnings sufficiently that they had only approached a temperature just below the ambient oven temperature of 200° F by the end of 40 hours. Another run was made using about 6% lime solution, but this increase in percent made only a small difference, perhaps attributable to differences in measurements. In neither case was overheating observed in the turnings.

During the course of the above experiments, about 30 runs having been made in all, the tests set forth above were done using poor quality turnings which have a much greater tendency to overheat due to the excessive contaminants present. In other words, the experiments were conducted using the type of turnings most likely to cause overheating. When cleaner and newer turnings were substituted for the ones referred to in the above examples, the tendency to overheat was reduced, although not eliminated unless the turnings were treated according to the present invention.

EXAMPLE NO. 7

Another set of experiments were conducted using cast iron borings which are substantially more active than steel turnings. These cast iron borings were mixed with iron turnings so that the resulting mixture was about 56% cast iron borings and about 44% poor quality contaminated turnings. When the bulk was untreated, and placed in an oven with an ambient temperature of 150° F the temperature of the bulk rose within 2 hours to the 150° F temperature and passed 200° F by 4 hours, which temperature it held until approximately 10 hours when it began falling off slowly toward the 150° temperature. When a similar mass of mixed borings and turnings were treated with about a 2% slurry of calcium oxide, the samples exhibited no overheating tendency whatever, and their temperature rose slowly from room temperature to ambient oven temperature in approximately 15 hours.

The conclusion reached as a result of the tests which were run shows that it does not matter whether calcium oxide or calcium hydroxide is used, provided it is applied in the form of an aqueous slurry, and provided the treatment is relatively complete as a result of sufficient tumbling of the mass of turnings to provide reasonably complete coating. There are of course pockets which remain uncoated here and there, and they tend to develop hot spots as though no treatment had been made, as would be reasonably expected. However, small hot pockets do not tend to produce significant overheating because the chain reaction does not continue to spread due to the presence of properly treated areas around the overheating pockets which isolate the hot spots and permit them to gradually cool down again.

This invention is not to be limited to the exact form shown in the drawings, for obviously changes may be made therein within the scope of the following claims.

We claim:

1. The method of passivating iron-containing cuttings and turnings materials to prevent overheating thereof as a result of the materials having been disturbed by being moved and compressed while wet into bulk confinement for storage or transportation thereof, comprising the steps of:
    (a) preparing an aqueous slurry of an alkaline calcium compound comprising an oxide or hydroxide thereof;
    (b) tumbling said materials while moving them into said confinement, and introducing into the tumbling materials a quantity of said slurry in the range of 1% to 5% by weight; and
    (c) continuing said tumbling until the materials are substantially coated with the slurry.

2. The method as set forth in claim 1, wherein said tumbling step comprises feeding said materials into one end of a tumbler and withdrawing them from the other end of the tumbler after a residence time of between 1 and 5 minutes; and adding said slurry to the materials as they are fed into the tumbler.

3. The method as set forth in claim 2, wherein said materials are passed in a continuous flow through said tumbler until the materials are all moved into said confinement, and said slurry is sprayed onto the materials as they enter the tumbler.

4. The method as set forth in claim 3, wherein the slurry sprayed onto the materials is about 2% by weight.

5. The method as set forth in claim 1, wherein said tumbling of the materials is performed incident to transporting of the materials into the hold of a ship.

* * * * *